US012710929B2

(12) United States Patent
Ballantyne et al.

(10) Patent No.: US 12,710,929 B2
(45) Date of Patent: Aug. 18, 2026

(54) BUILDING SOFTWARE USING VOLUME SNAPSHOTS

(71) Applicant: Dell Products L.P., Round Rock, TX (US)

(72) Inventors: Robert A. Ballantyne, Mansfield, MA (US); Lingyue Zhu, Shanghai (CN); Henrik Koren, Petach Tikva (IL); Tamilarasan Janakiraman, Cork (IE)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/456,821

(22) Filed: Aug. 28, 2023

(65) Prior Publication Data

US 2025/0077191 A1 Mar. 6, 2025

(51) Int. Cl.
*G06F 8/30* (2018.01)
*G06F 8/65* (2018.01)

(52) U.S. Cl.
CPC . *G06F 8/30* (2013.01); *G06F 8/65* (2013.01)

(58) Field of Classification Search
CPC ................. G06F 8/30; G06F 8/65; G06F 8/71
See application file for complete search history.

(56) References Cited

U.S. PATENT DOCUMENTS

2012/0254824 A1* 10/2012 Bansod ..................... G06F 8/71 717/101
2022/0091969 A1* 3/2022 Han .......................... G06F 8/71
2024/0168786 A1* 5/2024 Cherivirala ............. G06F 8/433
2024/0354102 A1* 10/2024 Hemadri ................... G06F 8/71

OTHER PUBLICATIONS

"Caching in GitLab CI/CD"; https://docs.gitlab.com/ee/ci/caching/; downloaded on Aug. 24, 2023.
Syme, Gordon; "Persisting Data in Workflows, When to Use Caching, Artifacts and Workspaces"; Published Dec. 14, 2020; https://circleci.com/blog/persisting-data-in-workflows-when-to-use-caching-artifacts-and-workspaces/; downloaded on Aug. 24, 2023.
"CloudBees Workspace Caching"; https://docs.cloudbees.com/docs/cloudbees-ci/latest/pipelines/cloudbees-cache-step; downloaded on Aug. 24, 2023.
Goenka, Mukul; "What is the Difference Between Build and Compile in Terms of Program Execution?"; Java; https://www.mindstick.com/forum/156814/what-is-the-difference-between-build-and-compile-in-terms-of-program-execution; Nov. 9, 2021.

* cited by examiner

*Primary Examiner* — Duy Khuong T Nguyen
(74) *Attorney, Agent, or Firm* — Ryan, Mason & Lewis, LLP

(57) ABSTRACT

Techniques are provided for building software using volume snapshots. One method comprises obtaining a volume snapshot of a workspace, wherein the volume snapshot comprises software files associated with a software development project; creating a new workspace from the volume snapshot; applying updates to the new workspace by fetching, from a software development system, code updates to the software files; and performing a software build on the new workspace to compile source code associated with the software files. The new workspace may be created from the volume snapshot using a read-only layer of the volume snapshot and the updates to the new workspace may employ a read-write layer of the volume snapshot. A volume snapshot may be created, in response to a validation of software files, using a given workspace and the updates to the given workspace.

20 Claims, 8 Drawing Sheets

BUILDING SOFTWARE USING VOLUME SNAPSHOTS

BACKGROUND

A software deployment pipeline automates a software delivery process, and typically comprises a set of automated processes and tools that allow software developers and an operations team to work together to generate and deploy application software code to a production environment using a software development platform. Software development tasks often employ a build process to compile the generated software code.

SUMMARY

In one embodiment, a method comprises obtaining a first volume snapshot of a first workspace associated with a software development project, wherein the first volume snapshot comprises a plurality of software files associated with the software development project; creating a second workspace from the first volume snapshot; applying one or more updates to the second workspace by fetching, from a software development system, one or more code updates to one or more of the plurality of software files; and performing a software build on the second workspace to compile source code associated with at least some of the plurality of software files associated with the software development project.

In one or more embodiments, in response to a validation of one or more of the plurality of software files associated with the software development project, a second volume snapshot is created using the second workspace and the one or more updates to the second workspace. The second volume snapshot may be stored in at least one volume snapshot repository. The second volume snapshot may represent a state of the second workspace for the validated one or more software files associated with the software development project.

In some embodiments, the creating the second workspace from the first volume snapshot employs a read-only layer of the first volume snapshot and the one or more updates to the second workspace employ a read-write layer of the first volume snapshot. The first volume snapshot may be generated using at least one processing device of an orchestration engine.

In at least one embodiment, the method further comprises obtaining at least one software repository from the software development system and storing the at least one software repository as a persistent volume. The at least one software repository stored as the persistent volume may be updated using at least one synchronization service. The creating the second workspace may further comprise creating the second workspace from the persistent volume.

Illustrative embodiments can provide significant advantages relative to conventional techniques. For example, technical problems associated with the build process of a software deployment pipeline are mitigated in one or more embodiments by employing volume snapshots of one or more workspaces associated with the software deployment pipeline.

Other illustrative embodiments include, without limitation, apparatus, systems, methods and computer program products comprising processor-readable storage media.

DETAILED DESCRIPTION

Figure 1:
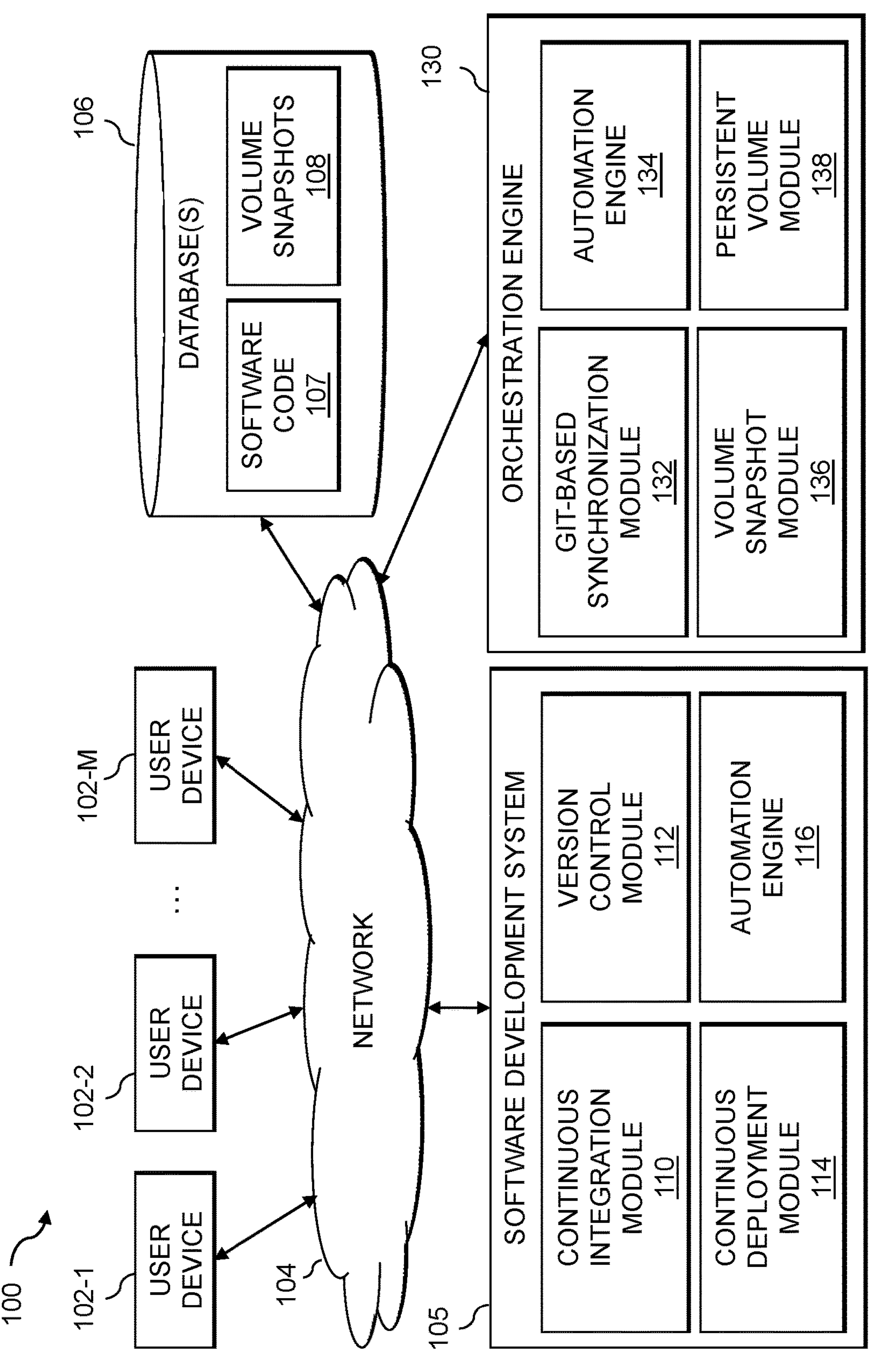
FIG. 1 illustrates an information processing system configured for building software using volume snapshots, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for building software using volume snapshots.

The term DevOps generally refers to a set of practices that combines software development and information technology (IT) operations. DevOps are increasingly being used to shorten the software development lifecycle and to provide continuous integration, continuous delivery, and continuous deployment. Continuous integration (CI) generally allows development teams to merge and verify changes more often by automating software generation (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment (CD) allows code changes that pass an automated testing phase to be automatically released into the production environment, thus making the changes visible to end users. Such processes are typically executed within a software generation and deployment pipeline.

DevOps solutions typically employ blueprints that encompass continuous integration, continuous testing (CT), continuous deployment (also referred to as continuous development) and/or continuous change and management (CCM) abilities. DevOps blueprints allow development teams to efficiently innovate by automating workflows for a software development and delivery lifecycle. A typical software development lifecycle is discussed further below in conjunction with FIG. 2.

A software deployment pipeline (sometimes referred to as a CI/CD pipeline) automates a software delivery process, and typically comprises a set of automated processes and tools that allow developers and an operations team to work together to generate and deploy application software code to a production environment. A preconfigured software deployment pipeline may comprise a specified set of elements and/or environments. Such elements and/or environments may be added or removed from the software deployment pipeline, for example, based at least in part on the software and/or compliance requirements. A software deployment pipeline typically comprises one or more quality control gates to ensure that software code does not get released to a production environment without satisfying a number of predefined testing and/or quality requirements. For example, a quality control gate may specify that software code should compile without errors and that all unit tests and functional user interface tests must pass.

During a CI/CD process, software code often needs to be fetched from a source code manager (SCM) server and cloned to populate a workspace each time the CI/CD process runs. When the CI/CD process completes, the environment and the workspace are typically deleted. One or more aspects of the disclosure recognize that, in an organization with a large number of CI/CD jobs and/or with large repositories, populating a workspace in this manner places a significant load on the SCM server and increases network traffic. In addition, with a newly populated workspace, the build process starts at the beginning without a cache.

In one or more embodiments, the disclosed techniques for building software using volume snapshots reduce software build times, as well as the load on the network and on the SCM server. A local read-only cache (e.g., in the form of a volume snapshot) is employed in some embodiments for the software code and for the build outputs for a particular code base. Volume snapshots are used in at least some embodiments to implement the read-only cache that provides an initial workspace. The initial workspace is then updated to apply any updates from the SCM to the software code. A software build process may then be performed using the initial workspace and the applicable updates.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105 and an orchestration engine 130.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a version control module 112, a continuous deployment module 114 and an automation engine 116. Exemplary processes utilizing elements 110, 112, 114 and/or 116 will be described in more detail with reference to, for example, the flow diagrams of FIGS. 4 through 6.

In at least some embodiments, the continuous integration module 110, the version control module 112 and/or the continuous deployment module 114, or portions thereof, may be implemented using functionality provided, for example, by commercially available DevOps and/or CI/CD tools, such as a Git-based DevOps and/or CI/CD tool. The continuous integration module 110, the version control module 112 and the continuous deployment module 114 may be configured, for example, to perform CI/CD tasks and to provide access to DevOps tools and/or repositories. The continuous integration module 110 provides functionality for automating the integration of software code changes from multiple software developers or other DevOps professionals into a single software project.

In one or more embodiments, the version control module 112 manages canonical schemas (e.g., blueprints, job templates, and software scripts for jobs) and other aspects of the repository composition available from the DevOps and/or CI/CD tool. SCM techniques may be used to track modifications to a source code repository. In some embodiments, SCM techniques are employed to track a history of changes to a software code base and to resolve conflicts when merging updates from multiple software developers. Such SCM techniques provide a definitive repository from which source code, orchestration code, test code and configuration information may be obtained.

The continuous deployment module 114 manages the automatic release of software code changes made by one or more software developers from a software repository to a production environment, for example, after validating the stages of production have been completed. The continuous deployment module 114 may interact in some embodiments with the automation engine 116 to resolve one or more errors in a software deployment pipeline and/or to verify a successful testing of a software deployment pipeline.

In at least some embodiments, the automation engine 116 may implement at least portions of the disclosed techniques for building software using volume snapshots, as discussed further below in conjunction with, for example, FIG. 5.

It is to be appreciated that this particular arrangement of elements 110, 112, 114 and/or 116 illustrated in the software development system 105 of the FIG. 1 embodiment is presented by way of example only, and alternative arrangements can be used in other embodiments. For example, the functionality associated with the elements 110, 112, 114 and/or 116 in other embodiments can be combined into a single module, or separated across a larger number of modules. As another example, multiple distinct processors can be used to implement different ones of the elements 110, 112, 114 and/or 116 or portions thereof.

At least portions of elements 110, 112, 114 and/or 116 may be implemented at least in part in the form of software that is stored in memory and executed by a processor.

In at least some embodiments, the orchestration engine 130 may be implemented, at least in part, using a container orchestration platform, such as a managed service for deployment and management of container clusters, as modified herein to provide features and functions of the present disclosure.

The orchestration engine 130 comprises a git-based synchronization module 132, an automation engine 134, a volume snapshot module 136 and a persistent volume module 138. Exemplary processes utilizing elements 132, 134, 136 and/or 138 will be described in more detail with reference to, for example, the flow diagrams of FIGS. 4 through 6.

In at least some embodiments, the git-based synchronization module 132 employs an automated git-based synchronization system that monitors a content of one or more git repositories and implements the changes that are made there (for example to synchronize a personal fork with an upstream repository that the personal fork was created from, such as the branches in the personal fork that are also present in the upstream repository).

In at least some embodiments, the automation engine 134 may implement at least portions of the disclosed techniques for building software using volume snapshots, as discussed further below in conjunction with, for example, FIG. 5. The orchestration engine 130, such as a pod-based container engine, may deploy applications that can access persistent storage volumes that are typically provisioned by container storage interface (CSI) plugins of respective external storage system vendors (e.g., one or more third-party providers of components of a storage system). A CSI plugin is typically deployed in a container environment as a set of components deployable on any or all nodes and comprises a CSI driver component (CSI driver) and one or more sidecar containers (sidecars). Sidecars typically interact with container objects and make calls to the CSI driver to manage container events.

Further, container storage modules (CSMs) are a set of technologies that attempt to extend the capabilities of CSI plugins, improving the observability, resiliency, protection, usability and/or data mobility for applications that leverage a storage portfolio of given vendor. In general, CSMs extend enterprise storage capabilities to the container environment. They also reduce management complexity so that developers can consume storage and automate their daily operations such as provisioning, snapshotting, and replication.

Generally, CSI plugins and CSM modules make capabilities of storage arrays available to container applications, while facilitating the provisioning models that automatically deploy infrastructure (including storage) based on application profiles and storage requirements expressed as code by the application developers. This enables greater efficiency and a broader range of capabilities while still allowing automated storage provisioning.

In at least some embodiments, the volume snapshot module 136 and/or the persistent volume module 138 may employ such CSI plugins and/or CSM modules to create a volume snapshot and/or to provision a new storage volume on a storage array as part of a persistent volume claim, as discussed further below in conjunction with FIG. 5.

It is to be appreciated that this particular arrangement of elements 132, 134, 136 and/or 138 illustrated in the software development system 105 of the FIG. 1 embodiment is presented by way of example only, and alternative arrangements can be used in other embodiments. For example, the functionality associated with the elements 132, 134, 136 and/or 138 in other embodiments can be combined into a single module, or separated across a larger number of modules. As another example, multiple distinct processors can be used to implement different ones of the elements 132, 134, 136 and/or 138 or portions thereof.

In one or more embodiments, the orchestration engine 130 may create execution environments using containers that provide a form of operating system virtualization. One container might be used to run a small microservice or a software process, as well as larger applications. The container provides the necessary executables, binary code, libraries, and configuration files. In some embodiments, the orchestration engine 130 may employ a container cluster that enables developers to provision, operate and/or manage enterprise-level container clusters to execute a pipeline job. An open-source containerization platform may be leveraged in some embodiments for building, deploying, and/or managing containerized applications. Such open-source containerization platforms enable developers to package applications into container-standardized executable components that combine application source code with operating system libraries and dependencies required to run that code in any environment.

Additionally, the software development system 105 and/or the orchestration engine 130 can have at least one associated database 106 configured to store data pertaining to, for example, software code 107 of at least one application and a repository of one or more volume snapshots 108. For example, at least a portion of the at least one associated database 106 may correspond to at least one code repository that stores the software code 107. In such an example, the at least one code repository may include different snapshots or versions of the software code 107, at least some of which can correspond to different branches of the software code 107 used for different development environments (e.g., one or more testing environments, one or more staging environments, and/or one or more production environments). The volume snapshots 108 comprise a copy of the metadata that describes the contents of a workspace along with a copy of the underlying storage in which the file content is saved. The term "workspace," as used herein, is intended to be broadly construed so as to encompass, for example, a working directory, such as a project folder or any area where a developer can view and/or modify software components. One or more aspects of the disclosure recognize that volume snapshots provide a copy of such workspaces (or portions thereof) and an efficient mechanism for recreating a workspace. A repository stores objects such as work items, streams and workspaces that help manage a change flow. The repository may store artifacts that represent (and can be retrieved as) files or folders in a file system.

Also, at least a portion of the one or more user devices 102 can also have at least one associated database (not explicitly shown in FIG. 1). As an example, such a database can maintain a particular branch of the software code 107 that is developed in a sandbox environment associated with a given one of the user devices 102, as discussed further below in conjunction with FIG. 3. Any changes associated with that particular branch can then be sent and merged with branches of the software code 107 maintained in the at least one database 106, for example.

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105 and/or the orchestration engine 130 in the FIG. 1 embodiment are assumed to be implemented using at least one processing device. Each such processing device generally comprises at least one processor and an associated memory, and implements one or more functional modules for controlling certain features of the software development system 105 and/or the orchestration engine 130.

More particularly, the software development system 105 and/or the orchestration engine 130 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as “processor-readable storage media” storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term “article of manufacture” as used herein should be understood to exclude transitory, propagating signals. These and other references to “disks” herein are intended to refer generally to storage devices, including solid-state drives (SSDs), and should therefore not be viewed as limited in any way to spinning magnetic media.

The network interface allows the software development system 105 and/or the orchestration engine 130 to communicate over the network 104 with the user devices 102, and illustratively comprises one or more conventional transceivers.

It is to be understood that the particular set of elements shown in FIG. 1 for software development system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105, the orchestration engine 130 and/or database(s) 106 can be on and/or part of the same processing platform.

Figure 2:
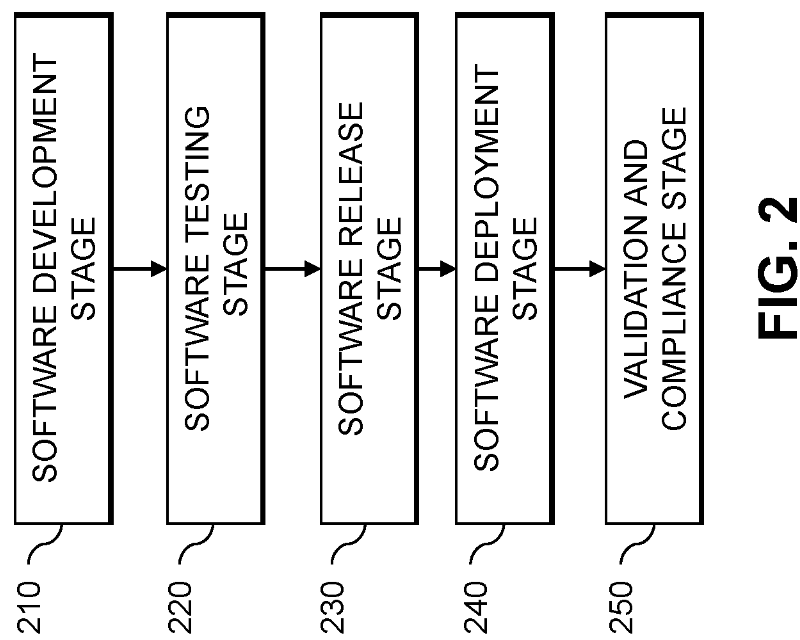
FIG. 2 shows an example of a software development lifecycle in an illustrative embodiment.

FIG. 2 shows an example of a software development lifecycle in an illustrative embodiment. A software development lifecycle is comprised of a number of stages 210 through 250. In the example of FIG. 2, a software development stage 210 comprises generating (e.g., writing) the software code for a given application. A software testing stage 220 tests the application software code. A software release stage 230 comprises delivering the application software code to a repository. A software deployment stage 240 comprises deploying the application software code to a production environment. Finally, a validation and compliance stage 250 comprises the steps to validate a deployment, for example, based at least in part on the needs of a given organization. For example, image security scanning tools may be employed to ensure a quality of the deployed images by comparing them to known vulnerabilities, such as those known vulnerabilities in a catalog of common vulnerabilities and exposures (CVEs).

In one or more embodiments, a pipeline can comprise one or more of the following elements: (i) local development environments (e.g., the computers of individual developers); (ii) a CI server (or a development server); (iii) one or more test servers (e.g., for functional user interface testing of the product); and (iv) a production environment. The pipelines may be defined, for example, in YAML (Yet Another Markup Language) with a set of commands executed in series to perform the necessary activities (e.g., the steps of each pipeline job).

Figure 3:
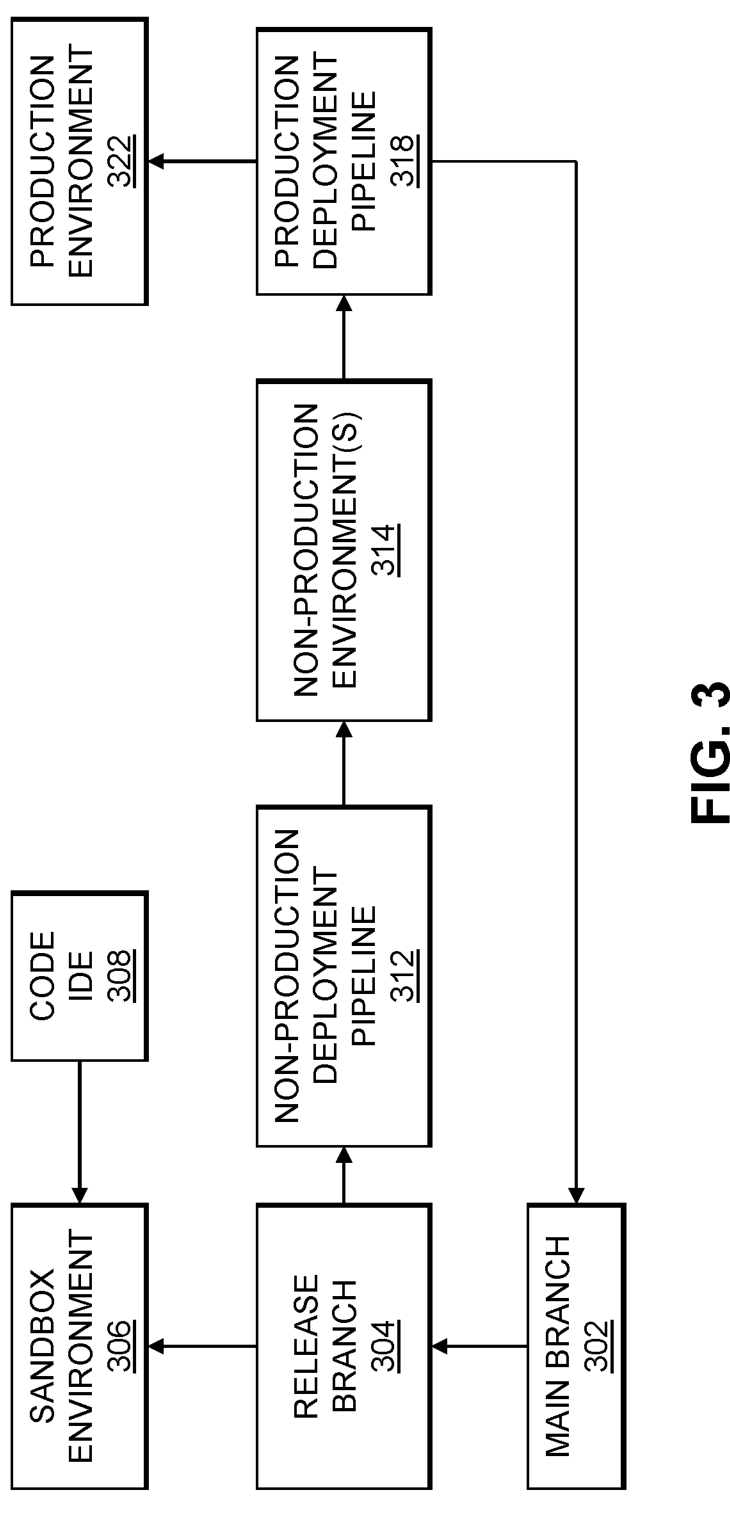
FIG. 3 shows an example of at least portions of the software development lifecycle of FIG. 2 in further detail, in accordance with an illustrative embodiment.

FIG. 3 shows an example of at least portions of the software development lifecycle of FIG. 2 in further detail in an illustrative embodiment. In the FIG. 3 example, a main branch 302 corresponds to software code of at least one software application. A release branch 304 is created based on the main branch 302. For example, the release branch 304 may be created based on development release timelines corresponding to the software application.

One or more developers (e.g., corresponding to user devices 102) create respective personal branches based on the release branch 304, and perform development work using a sandbox environment 306 and a code IDE (integration development environment) 308. Many developers prefer to write software code using such an IDE that allows the software to be developed in any programming language without having to deal with a particular language syntax. Developers may have multiple IDEs available for application development but there is currently no IDE available for writing software deployment pipeline code.

Developers can commit the changes made in their personal branches to the release branch 304. In the FIG. 3 example, a non-production deployment pipeline 312 is triggered according to one or more specified schedules. The non-production deployment pipeline 312 deploys any changes resulting from the change requests to one or more non-production environments 314.

In some examples, the non-production environment(s) 314 may include one or more of: a developer integration testing (DIT) environment, a system integration testing (SIT) environment, and a global environment. As noted above, the non-production deployment pipeline 312 may be triggered according to schedules defined for each of the non-production environments 314 (e.g., a first schedule for a DIT environment and a second schedule for an SIT environment).

A production deployment pipeline 318 can be triggered when the release branch 304 of the application is ready to be deployed to a production environment 322. Generally, the production deployment pipeline 318 collects any changes that were made to the release branch 304, creates a deployment package, and deploys the package to the production environment 322.

Figure 4:
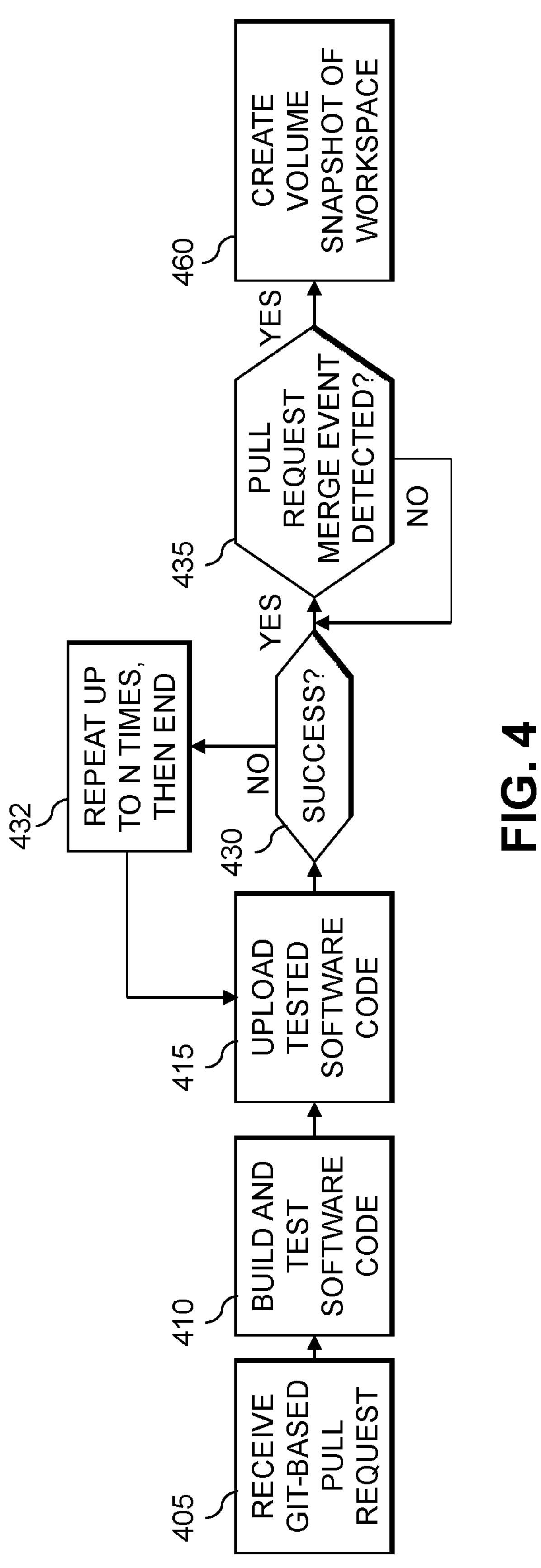
FIG. 4 is a flow chart illustrating an exemplary processing of git-based pull requests and the creation of a volume snapshot, in accordance with an illustrative embodiment.

FIG. 4 is a flow chart illustrating an exemplary processing of git-based pull requests and the creation of a volume snapshot, in accordance with an illustrative embodiment. In the example of FIG. 4, a git-based pull request is received in step 405 (for example, associated with a particular pipeline stage). The software code is then built and tested in step 410, and then uploaded in step 415, for example, to a software repository (not shown).

A test is performed in step 430 to determine if the software code passed one or more quality control checks and was properly uploaded to the software repository (e.g., a software repository associated with the current pipeline stage). If it is determined in step 430 that the software code did not pass one or more quality control checks or was not properly uploaded to the software repository, then the uploading of the software code is attempted again in steps 432 and 415, for example, up to N times, before program control ends.

If it is determined in step 430 that the software code passed the one or more quality control checks and was properly uploaded to the software repository, then, in step 435, a test is performed to determine if a merge event associated with the pull request has been detected. If it is determined in step 435 that the merge event was not detected, then program control returns to step 435 to wait for the merge event. Once it is determined in step 435 that the merge event was detected, then a volume snapshot of the workspace is created in step 460.

Figure 5:
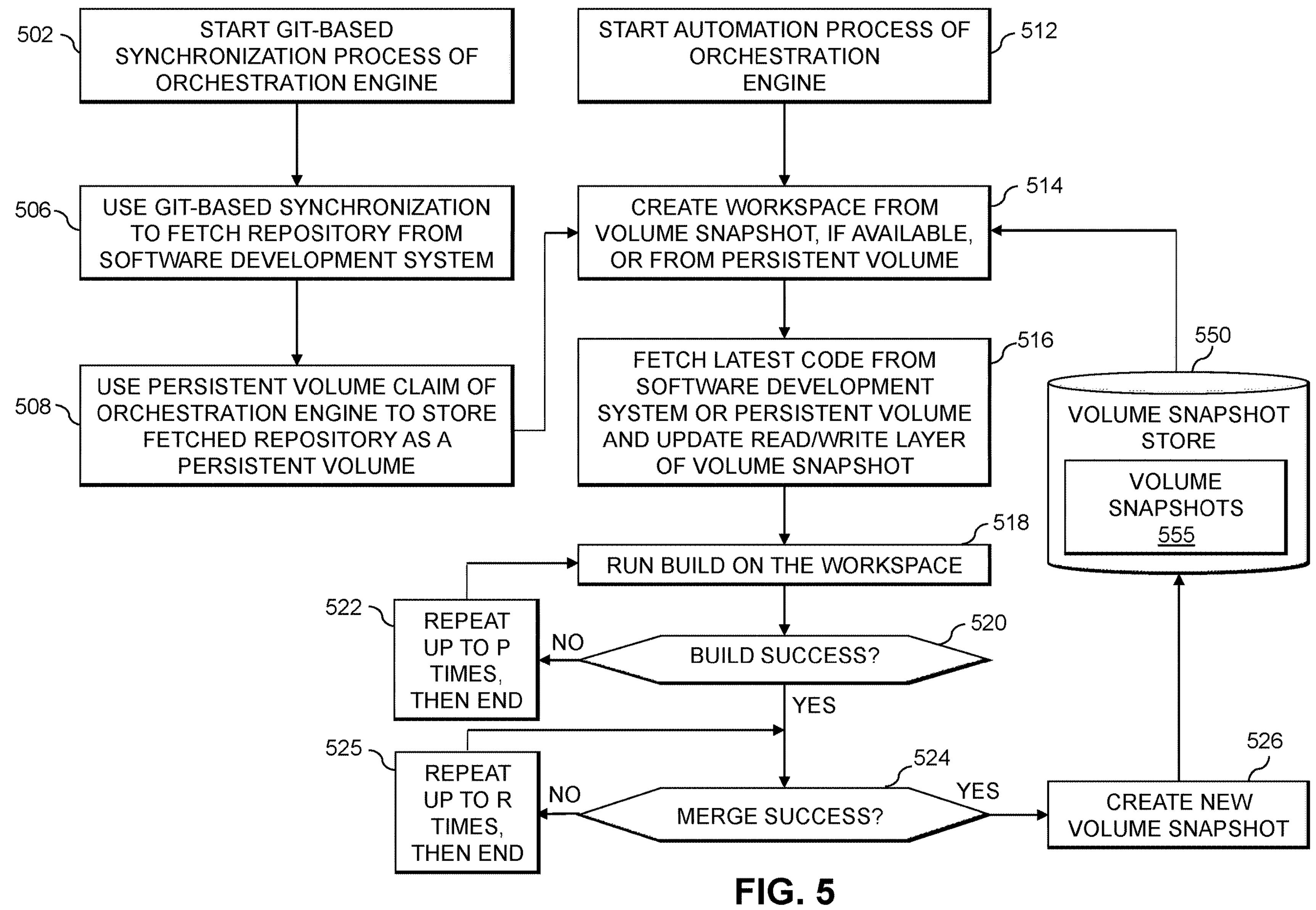
FIGS. 5 and 6 are flow diagrams illustrating exemplary implementations of processes for building software using volume snapshots, in accordance with illustrative embodiments.

FIG. 5 is a flow diagram illustrating an exemplary implementation of a process for building software using volume snapshots, in accordance with an illustrative embodiment. In the example of FIG. 5, a git-based synchronization process of the orchestration engine 130 is started in step 502 and used in step 506 to fetch a repository (e.g., a requested repository) from the software development system 105 of FIG. 1.

In step 508, a persistent volume claim of the orchestration engine 130 is used to store the repository fetched in step 506 as a persistent volume (for example, with a continuous updating of the persistent volume by the git-based synchronization process). For example, the git-based synchronization process may monitor a message queue for events indicating a change in the repository. The automation engine 116 of the software development system 105 of FIG. 1 may provide some of the automation employed in the processing of steps 506 and/or 508, as would be apparent to a person of ordinary skill in the art. In at least some embodiments, a persistent volume comprises a provisioned storage element and a persistent volume claim comprises a user request for storage.

In the example of FIG. 5, an automation process of the orchestration engine 130 is started in step 512. In some embodiments, step 512 is performed in conjunction with a pull request to prepare a workspace being built, for example. Step 512 may be triggered in response to a developer making a file change, such as a commit operation and/or a pull request.

A workspace is created in step 514 (*i*) from a volume snapshot, if available, for example, in a volume snapshot store 550 comprising a plurality of volume snapshots 555, or (ii) from a persistent volume. For example, a volume snapshot may be created in step 514 from the closest persistent volume in a directory of available persistent volumes created by the git-based synchronization service (e.g., based at least in part on a keyword search or a directory review).

The latest software code is fetched in step 516 from the software development system 105 (e.g., from the version control module 112 of FIG. 1), or from a persistent volume (e.g., created in step 508) and the read/write layer of the volume snapshot used in step 514 is updated. In some embodiments, the fetch operation brings in any changes that have occurred to the stored volume snapshot.

A build operation is performed on the workspace in step 518 (e.g., to create binary files and/or other artifacts). The term "build," as used herein, shall be broadly construed to encompass any operation or process that transforms (e.g., compiles) source code (or other software) into binary files, executable files, and/or other artifacts, as would be apparent to a person of ordinary skill in the art.

One or more aspects of the disclosure recognize that a volume snapshot provides an efficient mechanism for recreating a workspace but does not have compiled content. Thus, the build operation is performed in step 518 to obtain the compiled content.

A test is performed in step 520 to determine if the build operation succeeded. If it is determined in step 520 that the build did not succeed, then the build operation is attempted again on the workspace in steps 522 and 518, for example, up to P times, before program control ends. If, however, it is determined in step 520 that the build succeeded, then a further test is performed in step 524 to determine if a merge request succeeded (e.g., to merge two branches of software code).

If it is determined in step 524 that the merge request did not succeed, then the merge request is attempted again in step 525, for example, up to R times, before program control ends. If, however, it is determined in step 524 that the merge request succeeded, then a new volume snapshot is created in step 526 and stored in the volume snapshot store 550 that comprises a plurality of volume snapshots 555. The stored volume snapshot may then be reused for subsequent build operations. For example, the created volume snapshot may be created by combining the read/write layer employed in step 516 with the volume snapshot employed in step 514.

Figure 6:
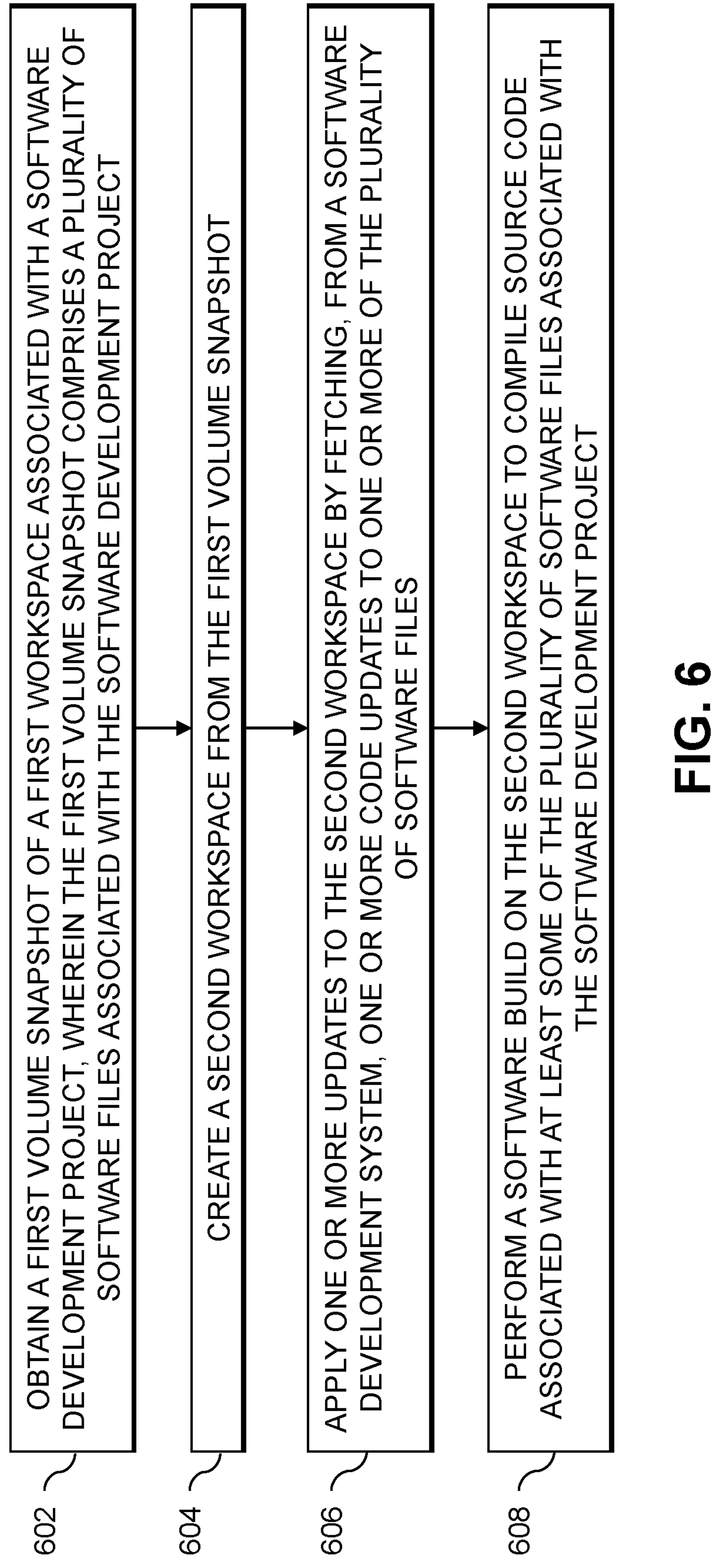

FIG. 6 is a flow diagram illustrating an exemplary implementation of a process for building software using volume snapshots, in accordance with an illustrative embodiment. In the example of FIG. 6, a first volume snapshot is obtained in step 602 of a first workspace associated with a software development project. The first volume snapshot comprises a plurality of software files associated with the software development project. In step 604, a second workspace is created from the first volume snapshot.

One or more updates to the second workspace are applied in step 606 by fetching, from a software development system, one or more code updates to one or more of the plurality of software files. A software build is performed on the second workspace in step 608 to compile source code associated with at least some of the plurality of software files associated with the software development project. In some embodiments, additional software may be added during the software build that performs a code quality analysis and/or a code coverage analysis, for example.

In one or more embodiments, in response to a validation of one or more of the plurality of software files associated with the software development project, a second volume snapshot is created using the second workspace and the one or more updates to the second workspace. The second volume snapshot may be stored in at least one volume snapshot repository. The second volume snapshot may represent a state of the second workspace for the validated one or more software files associated with the software development project.

In some embodiments, the creating the second workspace from the first volume snapshot employs a read-only layer of the first volume snapshot and the one or more updates to the second workspace employ a read-write layer of the first volume snapshot. The first volume snapshot may be generated using at least one processing device of an orchestration engine (e.g., the orchestration engine 130 of FIG. 1).

In at least one embodiment, the method further comprises obtaining at least one software repository from the software development system (e.g., the software development system 105 of FIG. 1) and storing the at least one software repository as a persistent volume. The at least one software repository stored as the persistent volume may be updated using at least one synchronization service (for example, with a continuous updating of the persistent volume by the git-based synchronization process, as discussed above in conjunction with FIG. 5). The creating the second workspace may further comprise creating the second workspace from the persistent volume, as discussed above in conjunction with FIG. 5.

The particular processing operations and other network functionality described in conjunction with the flow diagrams of FIGS. 2 through 6, for example, are presented by way of illustrative example only, and should not be construed as limiting the scope of the disclosure in any way. Alternative embodiments can use other types of processing operations to provide functionality for building software using volume snapshots. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Among other benefits, the disclosed techniques for building software using volume snapshots reduce network traffic, the load on an SCM server, the load on remote cache systems, the time until a workspace can be used for its intended purpose and/or the build time (e.g., as only the changed files will be recompiled, in some embodiments).

It should also be understood that the disclosed techniques for building software using volume snapshots can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for building software using volume snapshots may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based volume snapshot-based workspace creation engine, or portions thereof, are illustratively implemented for use by tenants of such a multi-tenant environment.

Cloud infrastructure as disclosed herein can include cloud-based systems. Virtual machines provided in such systems can be used to implement at least portions of a volume snapshot-based workspace creation platform in illustrative embodiments. The cloud-based systems can include object stores.

In some embodiments, the cloud infrastructure additionally or alternatively comprises a plurality of containers implemented using container host devices. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
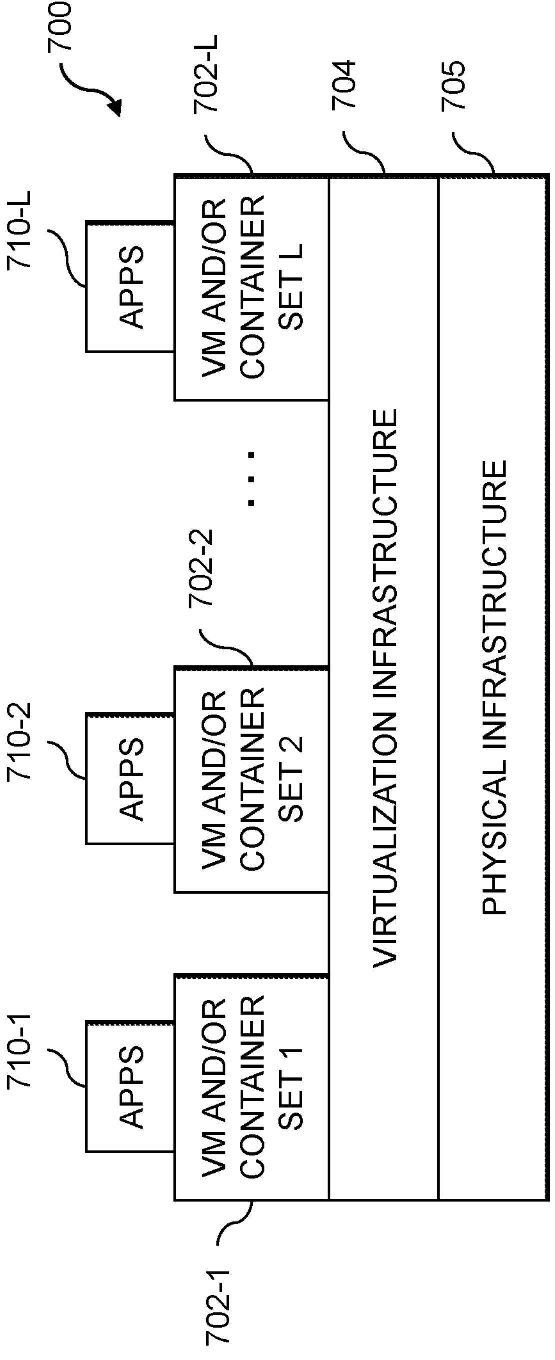
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide volume snapshot-based workspace creation functionality of the type described above for one or more processes running on a given one of the VMs. For example, each of the VMs can implement volume snapshot-based workspace creation control logic and associated functionality for updating the read/write layer of the volume snapshot for one or more build processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for containers running on bare metal hosts, or containers running on VMs. The containers are illustratively implemented using respective kernel control groups of the operating system. Such implementations can provide volume snapshot-based workspace creation functionality of the type described above for one or more processes running on different ones of the containers. For example, a container host device supporting multiple containers of one or more container sets can implement one or more instances of volume snapshot-based workspace creation control logic and associated functionality for updating the read/write layer of the volume snapshot in preparation for a build process.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
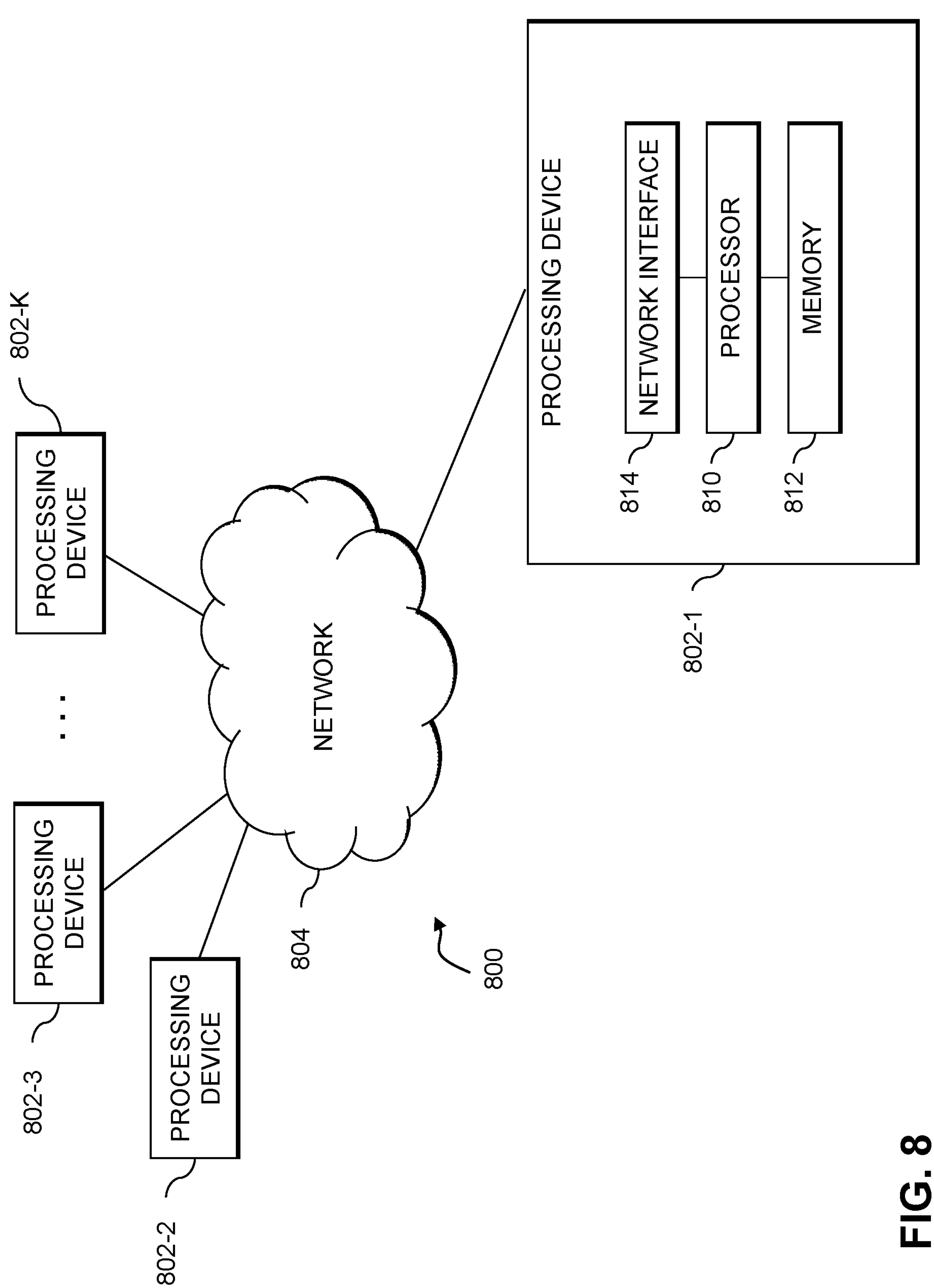
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide containers.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a first volume snapshot of a first workspace associated with a software development project, wherein the first volume snapshot comprises a plurality of source code files associated with the software development project;

creating a second workspace from the first volume snapshot, wherein the second workspace comprises at least a portion of one or more of the plurality of source code files;

applying one or more updates to at least some of the source code files of the second workspace, created from the first volume snapshot, to create an updated second workspace, by fetching, from a software development system, one or more code updates to one or more of the plurality of source code files;

performing a software build on at least some of the updated second workspace to compile the source code associated with the at least some updated source code files associated with the software development project into one or more executable files; and in response to a validation that (i) the software build succeeded and (ii) a request to merge at least two branches of the software development project succeeded, creating a second volume snapshot using the second workspace and the one or more updates to the second workspace;

wherein the method is performed by at least one processing device comprising a processor coupled to a memory.

2. The method of claim 1, further comprising storing the second volume snapshot in at least one volume snapshot repository.

3. The method of claim 1, wherein the creating the second workspace from the first volume snapshot employs a read-only layer of the first volume snapshot.

4. The method of claim 1, wherein the one or more updates to the second workspace employ a read-write layer of the first volume snapshot.

5. The method of claim 1, wherein the first volume snapshot is generated using at least one processing device of an orchestration engine.

6. The method of claim 1, further comprising obtaining at least one software repository from the software development system and storing the at least one software repository as a persistent volume.

7. The method of claim 6, wherein the creating the second workspace further comprises creating the second workspace from the persistent volume.

8. The method of claim 6, further comprising updating the at least one software repository stored as the persistent volume using at least one synchronization service.

9. An apparatus comprising:

at least one processing device comprising a processor coupled to a memory;

the at least one processing device being configured to implement the following steps:

obtaining a first volume snapshot of a first workspace associated with a software development project, wherein the first volume snapshot comprises a plurality of source code files associated with the software development project;

creating a second workspace from the first volume snapshot, wherein the second workspace comprises at least a portion of one or more of the plurality of source code files;

applying one or more updates to at least some of the source code files of the second workspace, created from the first volume snapshot, to create an updated second workspace, by fetching, from a software development system, one or more code updates to one or more of the plurality of source code files;

performing a software build on at least some of the updated second workspace to compile the source code associated with the at least some updated source code files associated with the software development project into one or more executable files; and in response to a validation that (i) the software build succeeded and (ii) a request to merge at least two branches of the software development project succeeded, creating a second volume snapshot using the second workspace and the one or more updates to the second workspace.

10. The apparatus of claim 9, wherein the creating the second workspace from the first volume snapshot employs a read-only layer of the first volume snapshot and wherein the one or more updates to the second workspace employ a read-write layer of the first volume snapshot.

11. The apparatus of claim 9, further comprising obtaining at least one software repository from the software development system and storing the at least one software repository as a persistent volume and updating the at least one software repository stored as the persistent volume using at least one synchronization service.

12. The apparatus of claim 11, wherein the creating the second workspace further comprises creating the second workspace from the persistent volume.

13. The apparatus of claim 9, further comprising storing the second volume snapshot in at least one volume snapshot repository.

14. The apparatus of claim 9, wherein the first volume snapshot is generated using at least one processing device of an orchestration engine.

15. A non-transitory processor-readable storage medium having stored therein program code of one or more software programs, wherein the program code when executed by at least one processing device causes the at least one processing device to perform the following steps:

obtaining a first volume snapshot of a first workspace associated with a software development project, wherein the first volume snapshot comprises a plurality of source code files associated with the software development project;

creating a second workspace from the first volume snapshot, wherein the second workspace comprises at least a portion of one or more of the plurality of source code files;

applying one or more updates to at least some of the source code files of the second workspace, created from the first volume snapshot, to create an updated second workspace, by fetching, from a software development system, one or more code updates to one or more of the plurality of source code files;

performing a software build on at least some of the updated second workspace to compile the source code associated with the at least some updated source code files associated with the software development project into one or more executable files; and in response to a validation that (i) the software build succeeded and (ii) a request to merge at least two branches of the software development project succeeded, creating a second volume snapshot using the second workspace and the one or more updates to the second workspace.

16. The non-transitory processor-readable storage medium of claim 15, wherein the creating the second workspace from the first volume snapshot employs a read-only layer of the first volume snapshot and wherein the one or more updates to the second workspace employ a read-write layer of the first volume snapshot.

17. The non-transitory processor-readable storage medium of claim 15, further comprising obtaining at least one software repository from the software development system and storing the at least one software repository as a persistent volume and updating the at least one software repository stored as the persistent volume using at least one synchronization service.

18. The non-transitory processor-readable storage medium of claim 17, wherein the creating the second workspace further comprises creating the second workspace from the persistent volume.

19. The non-transitory processor-readable storage medium of claim 15, further comprising storing the second volume snapshot in at least one volume snapshot repository.

20. The non-transitory processor-readable storage medium of claim 15, wherein the first volume snapshot is generated using at least one processing device of an orchestration engine.

* * * * *